(12) United States Patent
Russik

(10) Patent No.: US 7,654,034 B2
(45) Date of Patent: Feb. 2, 2010

(54) APPARATUS FOR CAPTURING AND ENTRAPPING AN INSECT

(76) Inventor: Robert Russik, 14237 Salem, Redford Township, MI (US) 48239

( * ) Notice: Subject to any disclaimer, the term of this patent is extended or adjusted under 35 U.S.C. 154(b) by 0 days.

(21) Appl. No.: 11/607,532

(22) Filed: Dec. 1, 2006

(65) Prior Publication Data

US 2008/0127549 A1 Jun. 5, 2008

(51) Int. Cl.
*A01M 1/06* (2006.01)
(52) U.S. Cl. ......................................................... 43/139
(58) Field of Classification Search ..................... 43/139
See application file for complete search history.

(56) References Cited

U.S. PATENT DOCUMENTS

| | | |
|---|---|---|
| 3,965,608 A | 6/1976 | Schuman |
| 4,074,458 A | 2/1978 | Catlett |
| 4,607,451 A | 8/1986 | Jarecki |
| 4,631,858 A | 12/1986 | Kahle |
| 4,794,725 A | 1/1989 | Numerick |
| 5,027,549 A | 7/1991 | Person |
| 6,226,919 B1 | 5/2001 | Septer |
| 6,910,298 B2 | 6/2005 | Schneidmiller |
| 2003/0131524 A1 | 7/2003 | Brown |
| 2004/0107141 A1 | 6/2004 | Conkel et al. |
| 2005/0028547 A1 | 2/2005 | Hatakeyama |
| 2005/0045785 A1 | 3/2005 | Cohen |
| 2005/0246945 A1 | 11/2005 | Evink |

*Primary Examiner*—Kurt Rowan
(74) *Attorney, Agent, or Firm*—M$^{ac}$Millan Sobanski & Todd, LLC

(57) ABSTRACT

A device for entrapping an insect includes a hollow cylinder, a piston located in the cylinder and sealed at an inner surface of the cylinder, a spring for urging the piston to move axially in the cylinder; and a releasable latch for securing the piston in an armed state, wherein the spring applies a force tending to move the piston axially and for releasing the piston from the armed state to produce a partial vacuum. A disposable cartridge containing an adherent able to entrap an insect pneumatically communicates with the suction side of the cylinder.

1 Claim, 6 Drawing Sheets

APPARATUS FOR CAPTURING AND ENTRAPPING AN INSECT

BACKGROUND OF THE INVENTION

1. Field of the Invention

This invention relates generally to an apparatus for entrapping an insect or another item. More particularly, an embodiment pertains to disposing of the entrapped item.

2. Description of the Prior Art

Insect capturing devices are often large, complex, and cumbersome to operate, and require an electric power supply. Some insect capturing devices require dangerous chemicals, which precludes their use in the vicinity of food preparation and service areas.

There is a need for a portable device that captures insects easily, reliably in a disposable container without the user risking contact with chemicals and without need for a power source. The device preferably provides a convenient, low-cost, disposable container that can be discarded safely with the captured insect located in the container.

The device is preferably reusable and the disposable container should provide a reasonable service life before replacement is required.

SUMMARY OF THE INVENTION

A device for entrapping an insect includes a hollow cylinder, a piston located in the cylinder and sealed at an inner surface of the cylinder, a spring for urging the piston to move axially in the cylinder, and a releasable latch for securing the piston in an armed state, wherein the spring applies a force tending to move the piston axially and for releasing the piston from the armed state to produce a partial vacuum. A disposable cartridge containing an adherent able to entrap an insect pneumatically communicates with the suction side of the cylinder.

The device is light-weight, manually operated and self-contained, requiring neither an external power source nor harsh or dangerous chemicals. It is easy to use and requires no clean-up after its use.

The device has handle and has an overall length of a suitable dimension to facilitate its reaching into hard-to-reach places. Its construction is simple and requires few moving parts.

The device is proven reliable and effective in drawing insects into a disposable cartridge with risk of their escape after capture.

The device operates pneumatically with a tubular cylinder having an open front end, a piston and a removable cartridge.

The piston is moved manually by the operator to an armed state against the force of a compression spring. A cartridge is inserted into the open end of the tube.

In operation, the open end of the tube that holds the cartridge is held near an insect with the piston in the armed, latched position. A release button is depressed to release the piston and allow it produce a vacuum in the cartridge. This action between the spring and piston produces a quick and strong vacuum in the front end of the tube, drawing the insect into the removable cartridge where it adheres to a tacky gel, which lines the inner surface of the cartridge. The cartridge can be removed, discarded and then replaced with a new cartridge.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which:

FIG. 5 is an isometric view of a cylindrical cartridge for use with the device of FIG. 1;

FIG. 6 is an isometric view of a conical cartridge for use with the device of FIG. 1;

FIG. 8 is a side view of an alternate cylindrical cartridge for use with the device of FIG. 1;

DESCRIPTION OF THE PREFERRED EMBODIMENT

Figure 1:
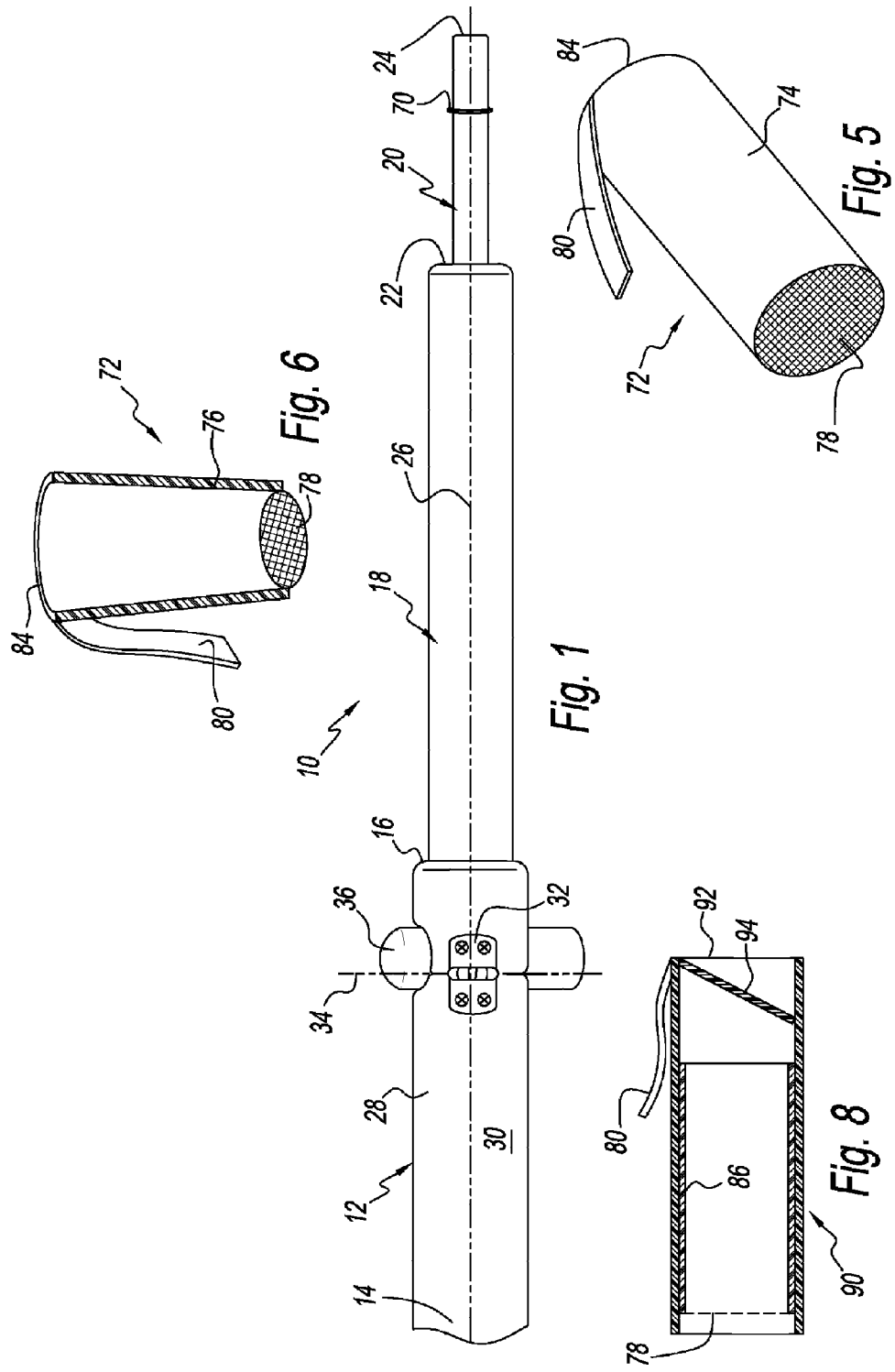
FIG. 1 is a side view of a pneumatically actuated device for capturing and discarding insects.
Figure 2:
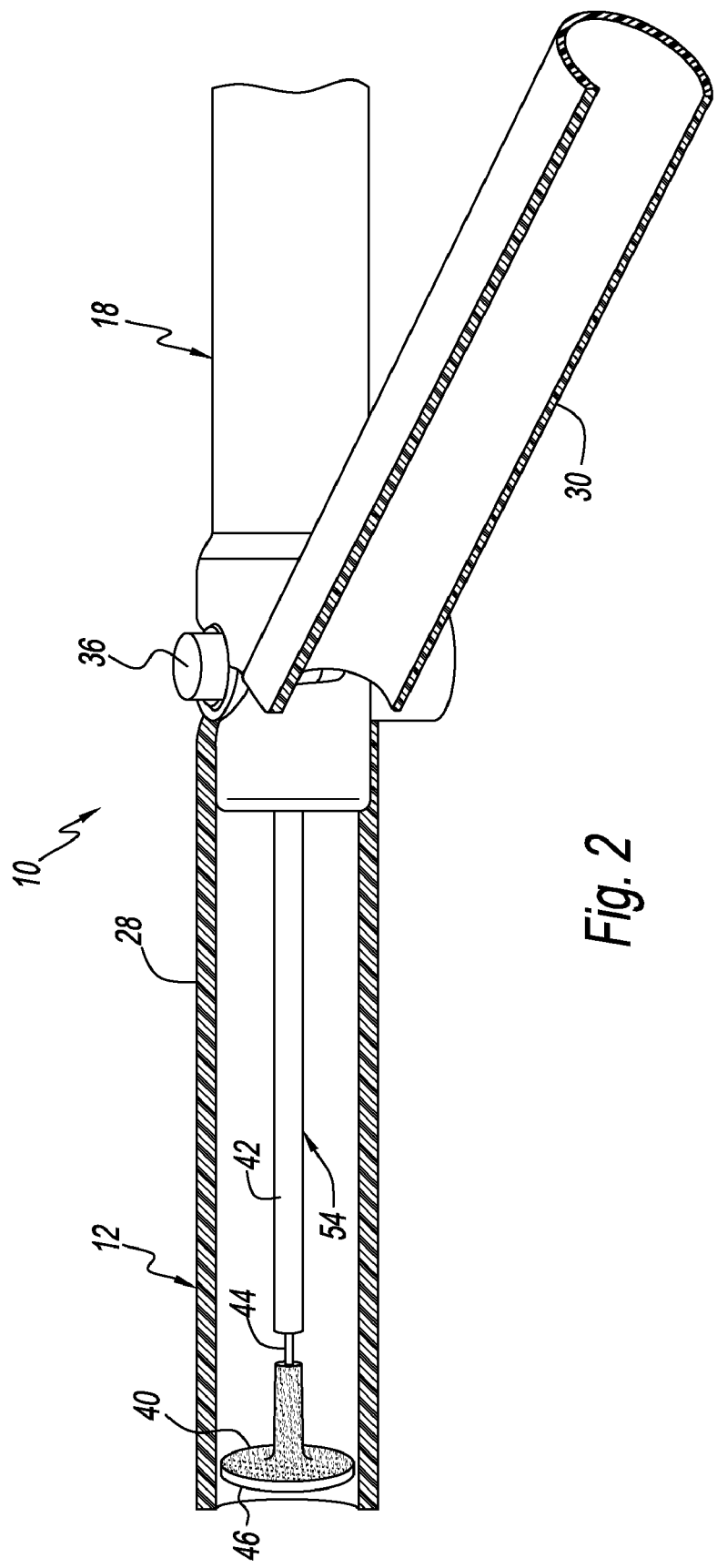
FIG. 2 is an isometric view partially in cross section showing a hinged portion of a cylinder of the device of FIG. 1 pivoted about a hinge axis.
Figure 3:
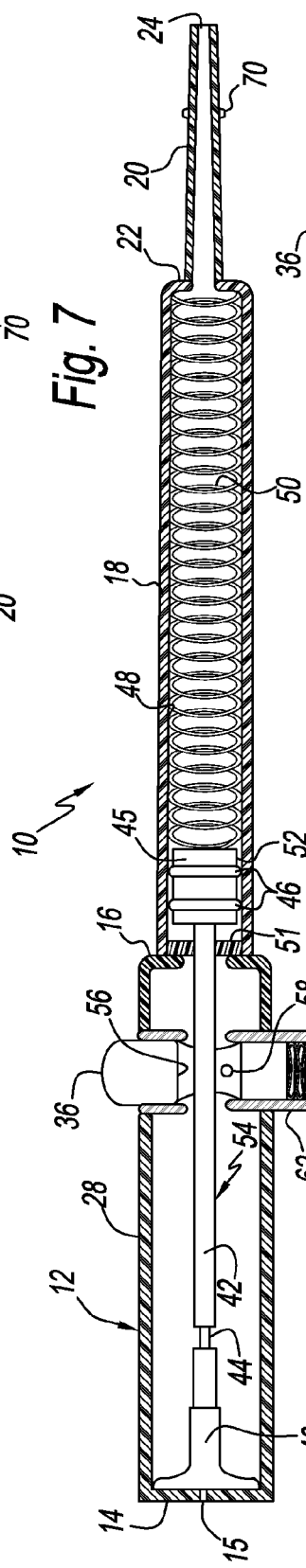
FIG. 3 is cross section taken at a diametric plane of the device of FIG. 1.

Referring first to FIGS. 1-3, a pneumatically actuated device for catching and discarding insects includes a hollow cylindrical handle 12, which is closed at one end 14 except for a vent hole 15 and having an opening at the opposite end 16. A hollow cylinder 18, preferably having a smaller diameter than that of the handle is open at each axial end and secured to the handle 12. A hollow tube 20, preferably having a smaller diameter than that of cylinder 18 and open at each axial end, is secured to an end 22 of cylinder 18 and extends axially to its open end 24. Preferably handle 12, cylinder 18 and tube 20 are aligned with a longitudinal axis 26. The relative sizes of the diameters and lengths of the handle 12, cylinder 18 and tube 12 may vary, such that any of these components may have the largest or smallest diameter, and any of these components may have the longest or shortest length.

In the embodiment of FIGS. 1-3, handle 12 is formed in two portions 28, 30, which are joined by a hinge plate 32, secured by screws to each portion, such that portion 30 can pivot about a transverse axis 34 to open the handle 12 and provide manual, external access to the handle's interior. An actuating member or button 36 extends radially from axis 26.

FIG. 2 shows the hinged portion 30 of handle, 12 pivoted about the hinge axis 34 and exposing an arming member 40, secured to a piston rod 42 and formed with a recess 44. The radial periphery 46 of arming member 40 is closely fitted relative to the inner surface 48 of cylinder 12. Piston rod 42, arming member 40 and recess 44 move axially as a unit within handle 12 along axis 24 from the end 14 of handle 12 toward the actuating member 36, preferably with an assist that provides a mechanical advantage. Access to the arming member 40 within handle 12 is provided by pivoting the handle portion 30 about the hinge axis 34 to open the handle.

FIG. 3 shows arming member 40 located in handle 12 and secured to rod 42 at one axial end, and a second piston 45 secured to the opposite end of the rod and located in cylinder 18. Piston 45 carries two O-rings 46, each of which is fitted in a circumferential recess on piston 45 and resiliently contacts the inner surface 48 of the cylinder 18, thereby forming a pneumatic seal between piston 45 and surface 48. A helical coiled compression spring 50, located in cylinder 18 and contacting an axial face 52 of piston 45 and the cylinder end 22, urges the piston assembly 54 toward the end 14 of handle 12. Spring 50 opposes movement of the piston assembly 54 in the opposite axial direction. A rubber disc 51, located at the end of cylinder 18, buffers contact between piston 45 and the end 16 of handle 12 and stabilizes the piston movement.

Figure 4:
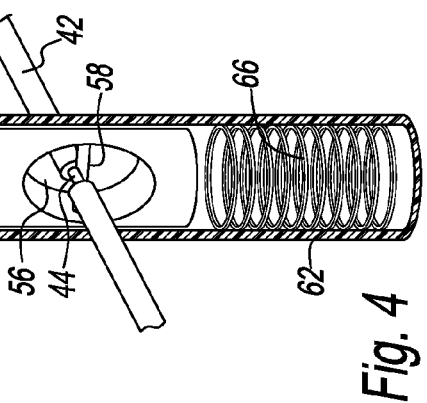
FIG. 4 is an isometric view partially cross sectioned showing a piston rod engaged with a latch that holds and releases the rod.

As FIGS. 3 and 4 illustrate, actuating member 36 is located in a cylindrical retainer 62, which is secured to handle 12 and is directed transverse to axis 26. Actuating member 36 is formed with an axial opening 56 and a pin 58, which extends laterally across the opening and substantially normal to axis 26 and piston rod 42. A helical coiled compression spring 66, located in retainer 62, continually urges the actuating member 36 toward rod 42 and into engagement with recess 44 when the recess becomes aligned with pin 58 as the rod moves axially along axis 26. Spring 66 continually opposes downward movement of the actuating member 36 and movement of pin 58 away from recess 44 and rod 42. Spring 66 urges actuating member 36 to the top of retainer 62.

Figure 7:
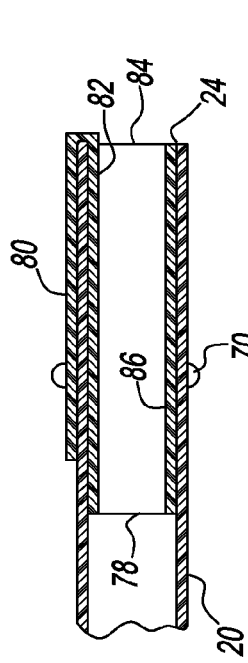
FIG. 7 is a longitudinal cross section taken at the outer end of the device of FIG. 1 with a cartridge installed.

Referring now to FIGS. 5-7, tube 20 carries on its outer surface an elastic retainer 70, such as an band 70 or a rubber O-ring, the retainer being spaced a suitable distance from its end 24. A disposable cartridge 72 has the form of a hollow circular cylinder 74, as shown in FIG. 5, or of a truncated cone 76, as shown in FIG. 6. In either case, the inner end of cartridge 72 is covered by a porous screen 78 secured to the wall of the cartridge. The outer end of cartridge 72 is fitted with a narrow, flexible tab 80. At least a portion of the inner surface 82 of cartridge 72, preferably a portion located near screen 78 and extending axially outward toward the outer end 84, is lined with an adhering substance 86 such as grease, glycerin, oil, petroleum jelly, or another substance having similar adhesive, tacky, gummy properties and consistency.

As FIG. 7 shows, the cartridge 72 is inserted into tube 20 though its open end 24 with the screen 78 located away from the open end 24 and the tab 80 wrapped over the outer surface of the tube 20 and under the elastic band 70. Cartridge 72 is secured to the tube 20 by the elastic band 70.

In operation, the device 10 is armed after opening cylinder 12 by pivoting cylinder portion 30 to the position shown in FIG. 2 and manually depressing arming member 40 against the force of spring 50 until recess 44 latches against latch pin 58. When the piston assembly 54 is latched, piston 45 is preferably located close to the outer end 22 of cylinder 18. The device 10 is then aimed at a target, such as an insect, by locating tube 20 and cartridge 72 near the target. The actuating member 36 is depressed manually, thereby disengaging the piston assembly 54 from latch pin 58. Spring 50 forces the sealed piston 45 rapidly leftward until arming member 40 reaches the end 14 of cylinder 12. This action produces a partial vacuum in tube 20, cartridge 72 and cylinder 18, which vacuum draws the target into the cartridge 72, where it contacts and adheres to the substance 86 located in the cartridge. The device can be reused with the current cartridge 72, or each cartridge can be discarded and replaced after each use with a new cartridge before its next use.

FIG. 8 illustrates an alternative embodiment of a disposable cartridge 90, in which the outer end 92 is substantially aligned with the open end 24 of tube 20 when the cartridge is installed. A hinged disc 94, supported on the wall of the cartridge 90 is closed by positive pressure produced at the head of piston 45 when the device 10 is armed. Disc 94 opens axially inward by the partial vacuum developed in cartridge 90 and tube 20 when the actuating member 36 is depressed and piston 45 is released. The hinged disc 94 can be applied also to the conical cartridge 76 shown in FIG. 6, or to a cartridge of any suitable shape.

Figure 9:
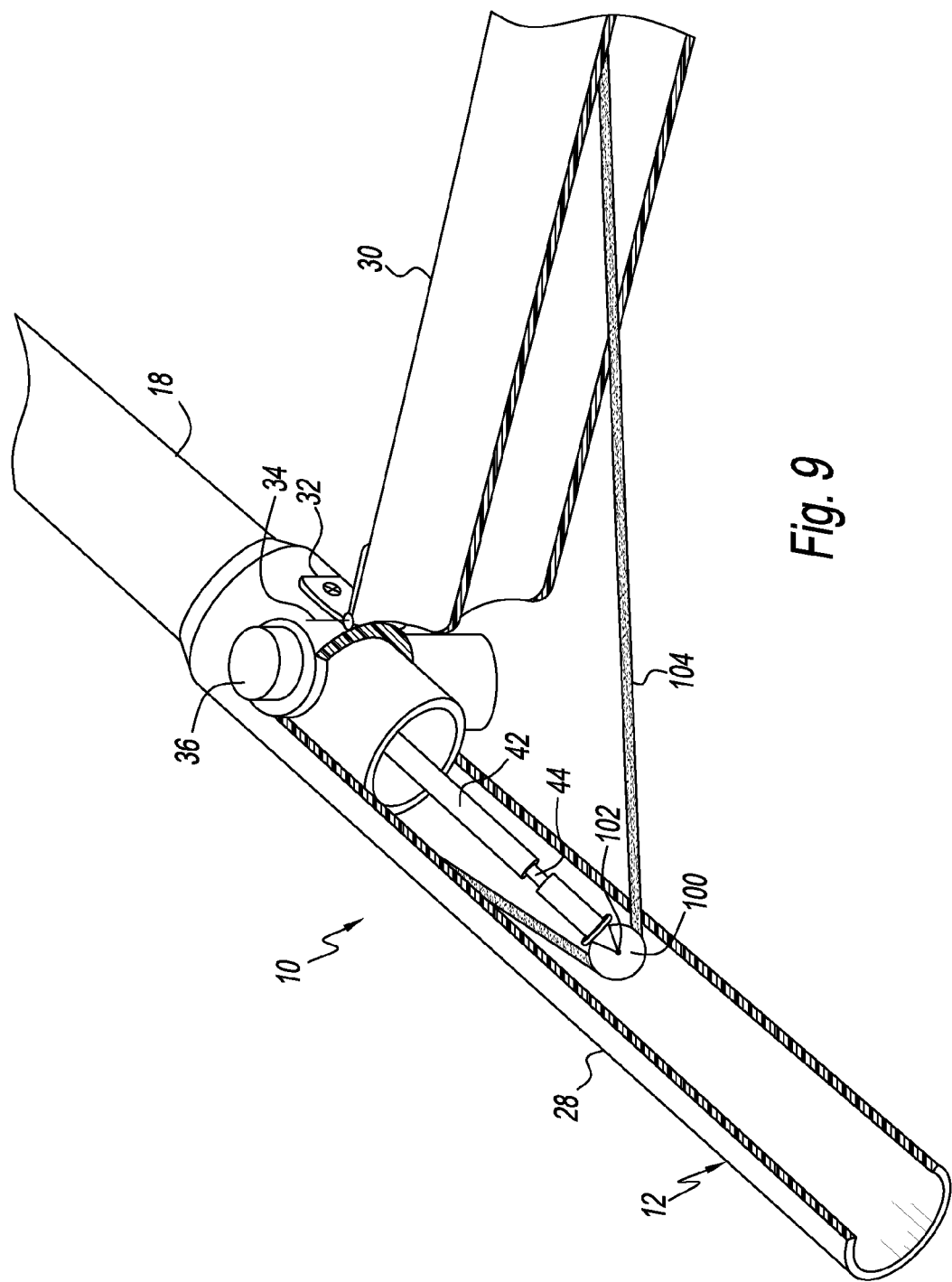
FIG. 9 is an isometric view of alternate embodiment of the apparatus shown in FIG. 1.

FIG. 9 illustrate an alternative embodiment, in which the device 10 is armed and latched as the handle portion 30 is pivoted on hinge 32 and the handle 12 is opened. In this embodiment, arming member 40 is replaced by a pulley wheel 100 secured to piston rod 42 for rotation about an axis 102 of the pulley. The actuating piston 45, which is located in and moves axially along cylinder 18, is secured to piston rod 42 and is pneumatically sealed between the inner surface 48 of cylinder 18 and the outer surface of piston 45, as shown in FIG. 3. A flexible belt 104, such as a wire, rope or string, is secured at one end to the inner surface of handle portion 30, loops around the pulley wheel 100, and is secured the inner surface of handle portion 28.

In operation, as the hinged cylinder portion 30 is pivoted to close handle 12 as shown in FIG. 1, spring 50 moves piston rod 42, recess 44 and piston 45 to the disarmed state of FIG. 3 axially to the armed position shown in FIG. 4. When the hinged cylinder portion 30 is opened by pivoting it about axis 34, the belt 104 is tightened about pulley wheel 100 as its end moves with handle portion 30 to the position of FIG. 9. This movement of the belt 100 forces pulley 102, piston rod 42, recess 44 and piston 45 to move axially to the armed position of FIG. 4, where latch pin 58 engages the recess 44. In the armed position, piston 45 is located close to the outer end 22 of cylinder 18.

Next, hinged handle portion 30 is closed and the belt 104 becomes contained in handle 12. A cartridge 72, 90 is inserted into tube 20 though its open end 24 with the screen 78 located away from the open end 84 and the tab 80 wrapped over the outer surface of the tube 20 and secured there by the elastic band 70.

The device 10 is then aimed at a target by locating tube 20 and cartridge 72 near the target. The actuating member 36 is depressed manually, thereby disengaging the piston assembly 54 from latch pin 58. Spring 50 forces the sealed piston 45 rapidly leftward until pulley 100 nearly reaches the end 14 of cylinder 12. This action produces a partial vacuum in tube 20 and cartridge 72, which vacuum draws the target into the cartridge, where it contacts and adheres to the substance 86 located in the cartridge 72, 90.

Figure 10:
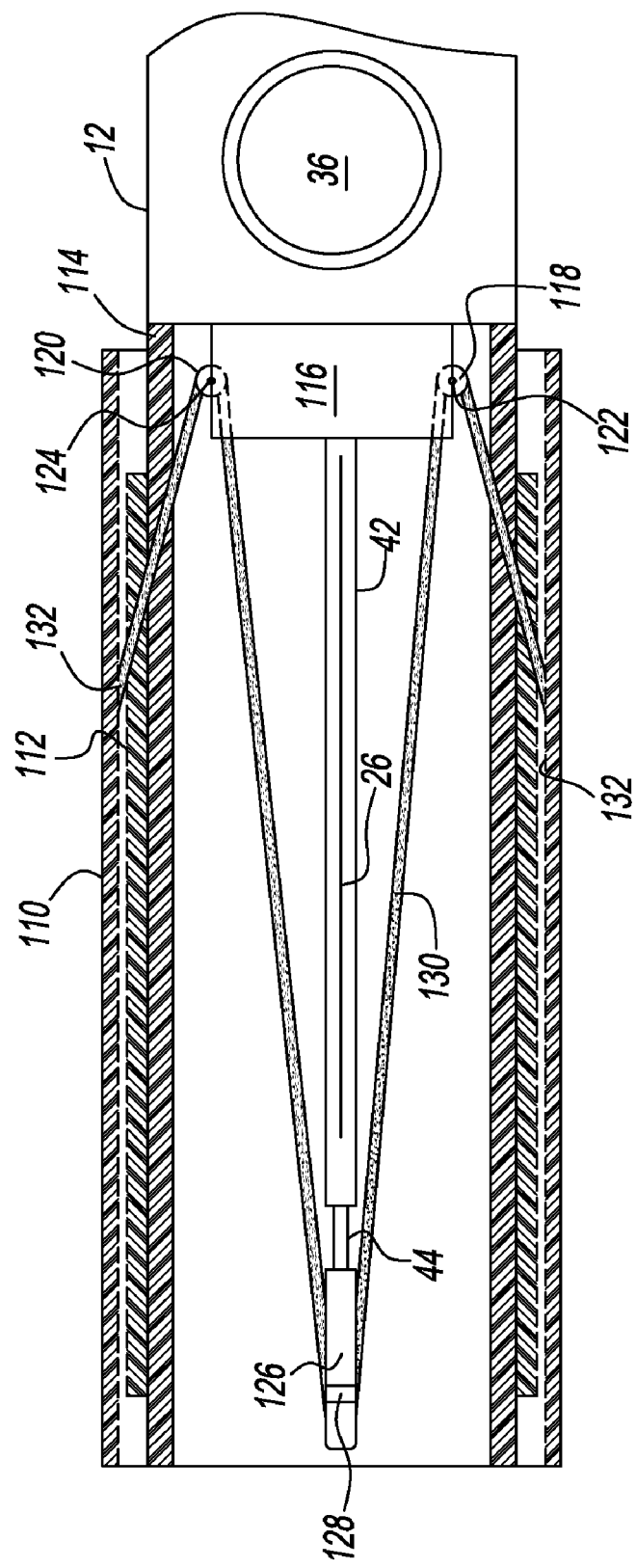
FIG. 10 is a cross section taken at the end of the handle of alternate embodiment of the device shown in FIG. 1.
Figure 11:
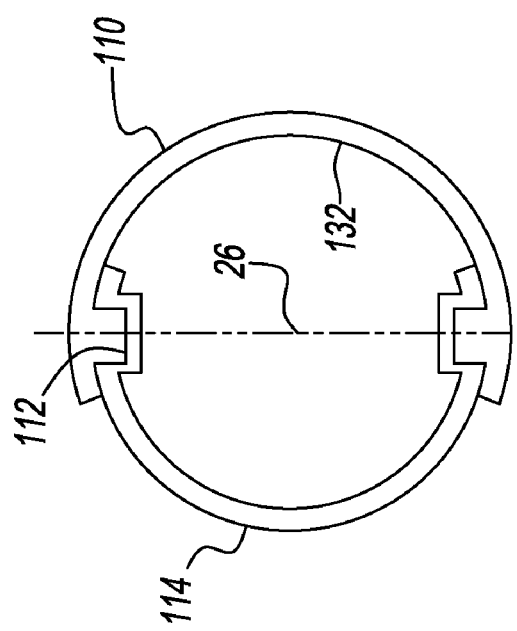
FIG. 11 is an end view of the embodiment of FIG. 10.

FIGS. 10 and 11 illustrate an alternative embodiment, in which the device is armed and latched when a moveable handle portion 110 slides axially leftward from the position shown in FIG. 10, guided in an axial recess 112 formed in a fixed handle portion 114, which is secured to cylinder 12. Handle portions 110 and 114 are preferably each a semicircular and, when in the position of FIG. 10, together form a hollow circular cylinder, similar to the handle portions 28, 30 shown in FIGS. 2 and 9. Handle portion 110 slides leftward and rightward along handle portion 114 due to manual force applied by the user, while handle portion 114 is held to resist movement of the sliding portion 110.

A support 116, secured to handle portion 114 supports pulleys 118, 120, which rotate about lateral axes 122, 124, respectively. In this embodiment, arming member 40 is replaced by a member 126, secured to piston rod 42 and formed with a lateral hole 128. The actuating piston 45, which is located in and moves axially along cylinder 18, is secured to piston rod 42. A flexible belt 130, such as a wire, rope or string, is secured at one of its ends to a radial inner surface 132 of handle portion 110 below axis 26, loops around pulley 118, passes through hole 116, loops around pulley 120, and is secured to the inner surface 132 of handle portion 110 above axis 26.

In operation, when the device is unarmed, spring 50 moves piston rod 42, recess 44, piston 45 and sliding handle portion 110 axially to the unarmed state of FIG. 10 by forcing piston rod 42 leftward. When the sliding handle portion 110 is moved manually leftward from the position of FIG. 10, belt 130 is drawn axially about pulley wheels 118, 124 and through hole 128. This movement of the belt 130 forces member 126, piston rod 42, recess 44 and piston 45 to move axially to the armed position, where latch pin 58 engages the recess 44. In the armed position, piston 45 is located close to the outer end 22 of cylinder 18.

Next, the handle is closed by sliding handle portion 110 rightward manually to the position of FIG. 10, which movement draws belt 130 into the handle. A cartridge 72, 90 is inserted into tube 20 though its open end 24 with the screen 78 located away from the open end 84 and the tab 80 wrapped over the outer surface of the tube 20 and secured there by the elastic band 70.

The device 10 is then aimed at a target by locating tube 20 and cartridge 72 near the target. The actuating member 36 is depressed manually, thereby disengaging the piston assembly 54 from latch pin 58. Spring 50 forces the piston 45 rapidly leftward until member 126, nearly reaches the end 14 of cylinder 12. This action produces a partial vacuum in tube 20 and cartridge 72, which vacuum draws the target into the cartridge, where it contacts and adheres to the substance 86 located in the cartridge 72, 90.

In accordance with the provisions of the patent statutes, the preferred embodiment has been described. However, it should be noted that the alternate embodiments can be practiced otherwise than as specifically illustrated and described.

What is claimed is:

1. A device for entrapping an insect comprising:
   a cartridge;
   a tubular cylinder pneumatically communicating with the cartridge;
   a handle secured to and extending from the cylinder, including a handle portion hinged to pivot and open the handle for access to an interior of the handle;
   a piston located in the cylinder and secured to a piston rod that extends into the handle;
   a spring for urging the piston to move along the cylinder;
   a releasable latch for securing the piston in an armed state and for releasing the piston from the armed state to move away from the cartridge and produce a partial vacuum in the cartridge; and
   an actuating member located in the handle, secured to the piston rod and engaged manually for moving the piston rod into engagement with the latch and for moving the piston in the cylinder toward the cartridge.

* * * * *